Patented Jan. 12, 1943

2,308,176

UNITED STATES PATENT OFFICE 2,308,176

OPERATIONS IN BOREHOLES

Lynn G. Howell, Houston, Tex., assignor to Standard Oil Development Company, a corporation of Delaware No Drawing. Application February 1, 1941, Serial No. 376,995

2 Claims. (Cl. 166—22)

The present invention is directed to a method for locating the position in boreholes of extraneous material introduced therein. More particularly, it is directed to a method for locating the position of cement behind casing in a borehole.

It has already been proposed, in U. S. Patent No. 2,220,205, issued November 5, 1940, entitled "Detectable cement for boreholes and method for locating same," to add to cement which is used in the setting of casing in boreholes a radioactive material such as carnotite and then to determine the height to which the cement rises behind the casing by passing a detector for gamma-ray radiations along the casing. Carnotite is a material which emits gamma-rays. Its life as an emitter of gamma-rays seems to be permanent. Calculations indicate that its life exceeds several million years. Consequently, when this material is added to cement in a borehole it becomes thenceforth impossible to log the borehole by measuring the gamma-rays emitted by the formations surrounding it, since the strength of carnotite is so great it obscures the relatively feeble emissions of the naturally occurring formations.

The principal object of the present invention is the provision of a method which will have the advantages of the method described in the aforesaid patent without having the disadvantage of rendering a cased hole unsuitable for future formation logging by measurement of gamma-rays. To this end, it is proposed, according to the present invention, to add to cement or any other material which is to be located in a borehole, particularly behind casing, a material capable of emitting gamma-rays for a relatively short predetermined period of time.

It has been found that gamma-ray activity can be imparted to isotopes of certain elements. To put it another way, it has been found that by bombarding certain elements with neutrons, deuterons, etc., it is possible to convert these elements into isotopes which possess gamma-ray activity for varying periods. The methods for preparing these active isotopes and the gamma-ray activity of the various isotopes which have been prepared may be found in an article entitled "A table for induced radio-activities," published in the January, 1940, issue of "Reviews of Modern Physics," at pages 30 et seq. Additional methods for preparing these isotopes are given in U. S. Patent No. 2,206,634. The interesting thing about these isotopes is that they can be combined with other elements to form water-soluble compounds which will possess the induced radioactivity which has been imparted to the element itself. Likewise, the elements can be subjected to a series of chemical reactions the result of which may be a water-soluble or water-insoluble compound of the element, and the resulting compound will possess radioactivity to a degree characteristic of the element itself. Thus, in the practice of the present invention, wide latitude is provided for the manner in which the material having induced radioactivity may be mixed with the cement or other material which is to be placed in the well.

In the practice of the present invention, particularly with respect to cementing operations in which cement is poured at the bottom of a hole and then forced up outside the casing, and where it is desired to determine the height attained by the cement outside the casing, it is usually sufficient to add some of the radioactive material to the first batch of cement introduced into the borehole. This can be added in the form of the radioactive isotope itself or in the form of a compound of said isotope. After the cement containing radioactive material is in place, a Geiger counter or other gamma-ray sensitive device, is moved along the borehole until its arrival opposite the material containing the radioactive ingredient is indicated by a sharp deflection of the indicating instrument at the surface.

Among the isotopes which may be utilized according to the present invention may be included: $Na^{24}$, with a half life of 14.8 hrs.; $Cl^{38}$, with a half life of 37 minutes; $Ca^{41}$, with a half life of 8.5 days; $Ca^{45}$, with a half life of 180 days; $Ca^{49}$, with a half life of 2.5 hrs.; $Mn^{52}$, with a half life of 6.5 days; $Mn^{56}$, with a half life of 2.59 hrs.; $Fe^{59}$, with a half life of 47 days; $Co^{55}$, with a half life of 18.2 hrs.; $Ni^{63}$, with a half life of 2.6 hrs.; $As^{76}$, with a half life of 26.8 hrs.; $Ag^{106}$, with a half life of 8.2 days; $Cd^{115}$, with a half life of 2.5 days; and $Au^{198}$, with a half life of 2.7 days. The number adjacent the element indicates the atomic weight of the isotope. The half life of these isotopes is given because their radioactivity decays exponentially and the life periods which have been determined are only those covering the period during which the activity decreases by half.

An interesting aspect of the present invention is that it permits the location of two different materials in a borehole by mixing with these materials radioactive substances having different periods of activity whereby the location of the substance containing the radioactive material of shorter life can be first made, followed by another run after the activity of the shorter-lived material had diminished to a negligible value, to locate the substance containing the longer-lived material. Thus, where the cementing is conducted in stages, a radioactive material of a life of several days may be added to the cement, and radioactive material of successively shorter lives can be added to successive batches of cement. Then, when the cement is in place, a gamma-ray sensitive device is lowered in the well and a log chart made of the gamma-ray intensity throughout the length of the well. After the activity of the shortest-lived radioactive material has subsided, a second chart can be made on which the position of the last batch of cement can be noted by the drop of gamma-ray intensity at that point. The next preceding batches of cement can be similarly located by making successive charts spaced apart by periods corresponding to the lives of the radioactive materials added.

In one type of cementing operation, a fast-setting cement is first introduced into the well in order to form a plug behind the casing so that pressure can be applied to subsequently introduced slow-setting cement to force it into the formation below the plug. By using radioactive materials of different lives in the respective types of cement used in this operation, it is readily possible to determine the position of the plug behind the casing. Similarly, in squeeze cementing jobs, which are frequently conducted in stages, often by forming plugs above and below the formation into which cement is to be squeezed, the utilization of radioactive materials of different lives in the various batches of cement offers considerable advantage.

As previously indicated, the use of these radioactive materials of predetermined life is also advantageous in the location of substances other than cement in a borehole. For example, it is frequently desirable to inject liquids into formations. In such a case, a compound of a radioactive isotope which is soluble in the liquid can be added thereto before it is injected and the location of the major concentration of the liquid can be subsequently determined by the use of a Geiger counter or other gamma-ray sensitive device. In many cases, it is desirable to position seals made of various types of gels in a borehole. The addition of radioactive materials to such gels is contemplated according to the present invention.

The nature and objects of the present invention having been thus described and illustrated, what is claimed as new and useful and is desired to be secured by Letters Patent is:

1. In an operation conducted in a borehole in which at least two extraneous materials are placed in the borehole and it is desired to determine the position which such materials assume in the borehole, the steps of adding to each such material before introducing it into the borehole a radioactive material of relatively short life, the life of said radioactive material being different for each such extraneous material, placing said materials in the borehole, producing a radioactive well log of said borehole during the life of the shortest lived radioactive material, and producing a second radioactive log of said borehole after the termination of the life of the shortest lived radioactive material whereby the location of the extraneous material containing the shortest lived radioactive material can be determined by comparison of said logs.

2. A method of conducting cementing operations in stages in a borehole in such a way that the cement introduced in the respective stages can be subsequently located, the steps which comprise adding to the cement introduced in each stage a radioactive material of relatively short life, the life of said radioactive material being different for each stage of the cementing operation, then, after the stages of cementing are completed and during the life of the shortest lived radioactive material, producing a radioactive well log of the borehole, subsequently, after the termination of the life of the shortest lived radioactive substance, producing a second radioactive well log of said borehole whereby the position of the cement introduced in that stage in which the shortest lived radioactive substance was added can be determined by comparison of the logs, and repeating the logging operations after the termination of the lives of successively longer lived radioactive substances in order that the cement introduced in successive stages may be located by comparison of said logs.

LYNN G. HOWELL.